Patented Aug. 8, 1944

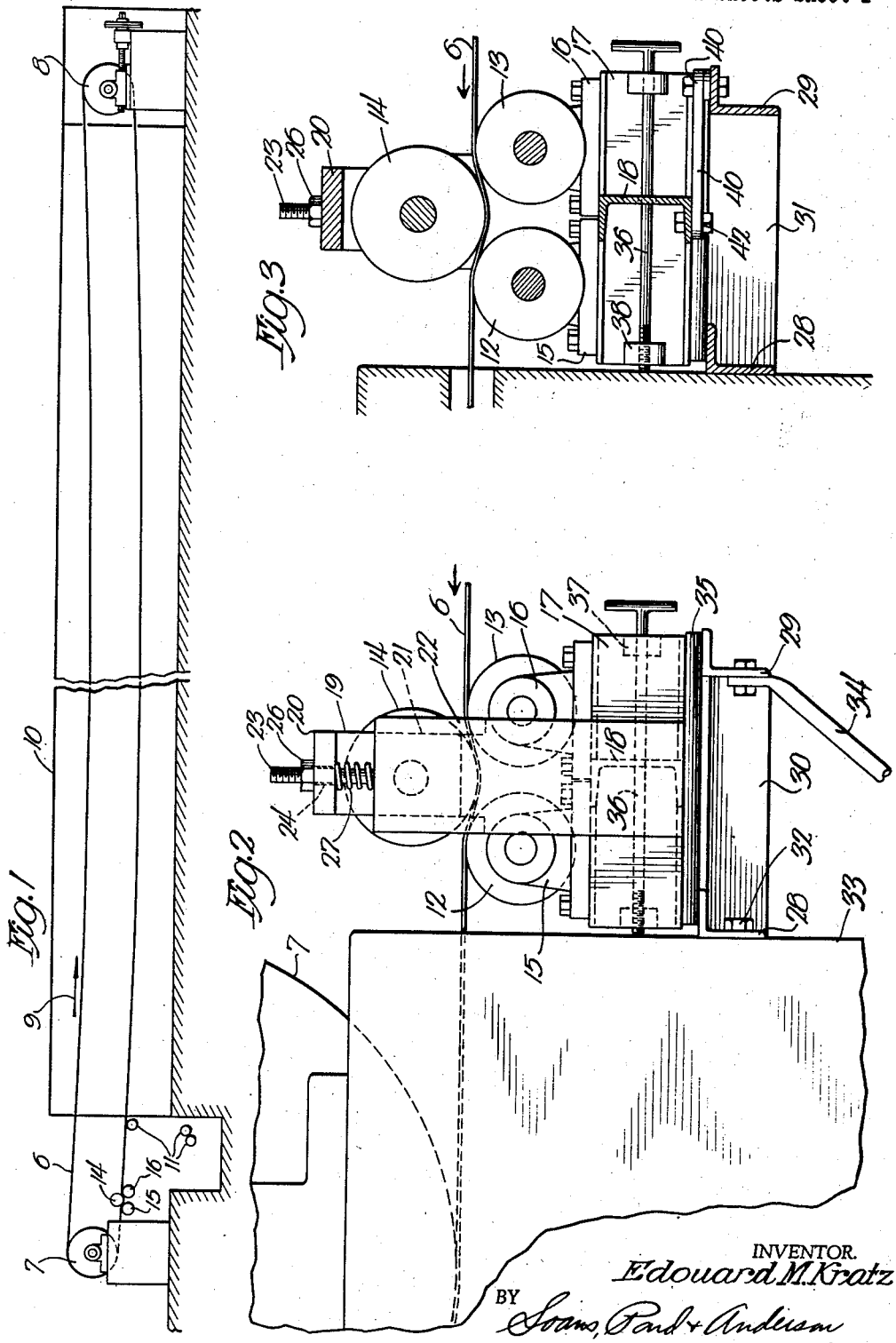

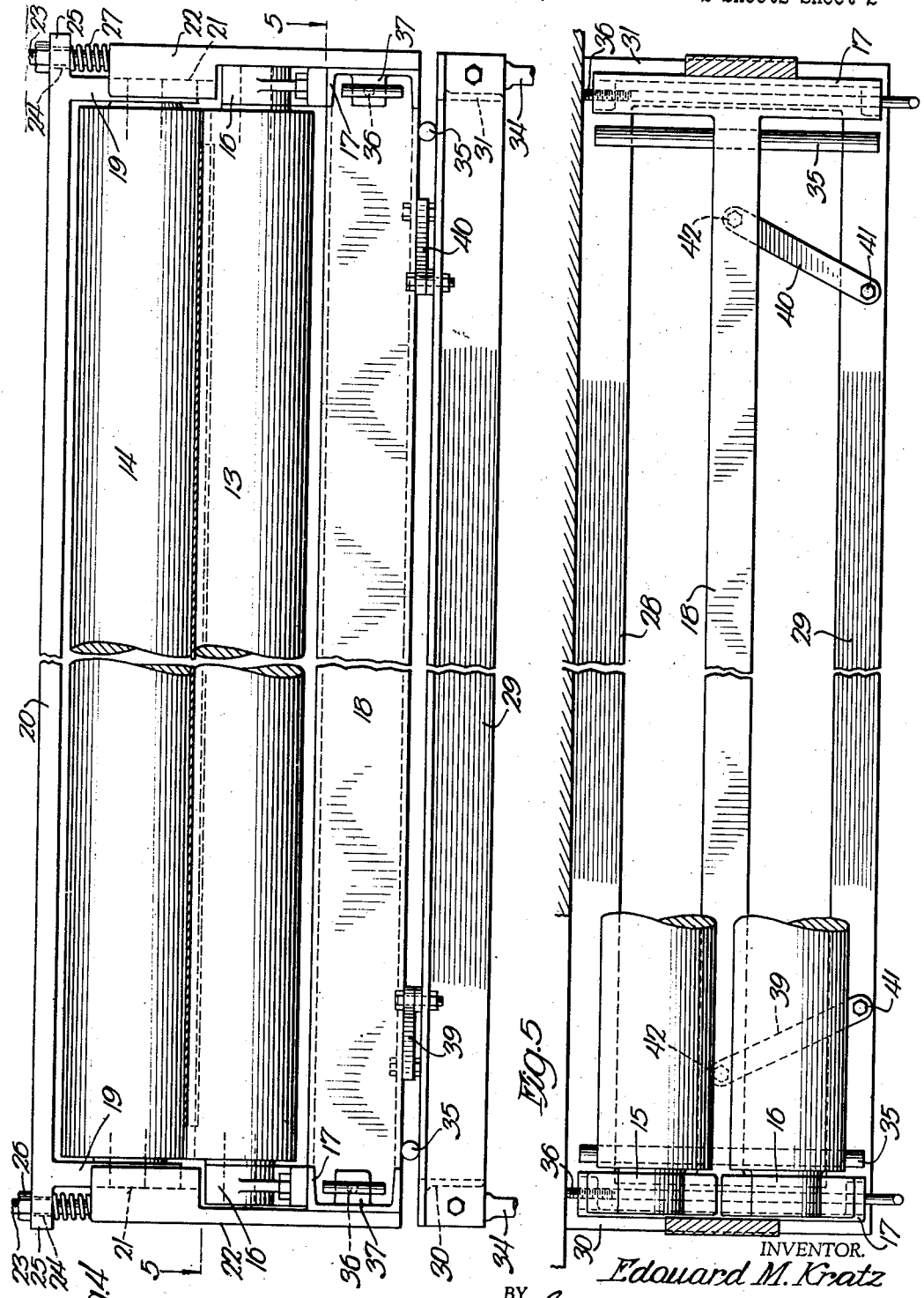

2,355,448

UNITED STATES PATENT OFFICE 2,355,448

BAND LEVELING APPARATUS

Edouard M. Kratz, Gary, Ind., assignor, by mesne assignments, to Carbide and Carbon Chemicals Corporation, New York, N. Y., a corporation of New York Application November 12, 1941, Serial No. 418,763

5 Claims. (Cl. 198—184)

This invention relates to improvements in band leveling apparatus and it has particular reference to apparatus for effecting adjustment or setting of relatively long metallic or like conveyor belts which, in the course of normal use have a tendency to stretch unevenly so as to cause the belt to be lengthened adjacent one side or intermediate its edges with resulting buckling or canting of the belt. By restoring the belt to uniform length throughout its width, the belt is restored to a normal or level position such as is required in many instances such as, for example, in apparatus for making sheet material.

The main objects of the invention are to provide a relatively simple but efficient apparatus for effecting leveling of a conveyor belt or band or, in other words, for effecting stretching of any longitudinally shortened portion of the band to restore it to uniform length at all points in its width; to provide such mechanism which may be permanently associated with the band but normally adjusted to inoperative position so as to have no effect on the band during normal usage of the band; to provide such mechanism which will automatically counteract any tendency of the band to run to one side or the other because of inequalities in its length at various transversely disposed points; and in general it is the object of the invention to provide improved apparatus of the character indicated.

Other objects and advantages of the invention will be understood by reference to the following specification and accompanying drawings (2 sheets) wherein there is disclosed a selected embodiment of band leveling apparatus according to the present invention.

In the drawings, Fig. 1 is a diagrammatic side elevation of a conveyor belt structure having the improved band leveling apparatus associated therewith.

Fig. 2 is a side elevation of the band leveling apparatus.

Fig. 3 is a transverse section through the apparatus.

Fig. 4 is a front view and Fig. 5 is a section on the line 5, 5 of Fig. 4.

In the diagrammatic illustration of Fig. 1, an endless conveyor belt or band is represented at 6, said belt being supported at its front and rear ends by suitably journaled rolls 7 and 8 respectively. The rear roll 8 is preferably so mounted that it may be moved toward and from the roll 7 to thereby control the extent to which the belt may sag between the end supporting rolls. In a typical apparatus such as herein contemplated wherein the endless band 6 is employed for forming sheet material, liquid material is delivered to the band at its front end either on or adjacent to the supporting roll 7. The band travelling in the direction indicated by the arrow 9 carries the fluid material into a suitable oven 10 which encloses most of the length of the band, the temperatures and air conditioning of the oven being suitably regulated to effect setting and drying of the liquid material to form the sheeting. The sheeting is carried rearwardly on the upper reach of the band and continues around the rear supporting roll 8 and moves forwardly through the lower portion of the oven and is stripped from the band and is reeled on suitable reeling apparatus represented by the rolls 11. In one typical apparatus embodying elements such as above set forth, the endless conveyor band 6 measures approximately 165 feet from center to center of the front and rear supporting rolls 7 and 8.

In apparatus such as above described, the belt or band 6, because of its great length, is necessarily placed under high tension and is subjected to constant stretching forces which are not always applied uniformly over the entire width of the band. For example, the liquid material for forming the sheeting is deposited on the band over all but narrow marginal portions thereof. The deposited liquid may itself be at such a high temperature that the heat thereby imparted to the band 6, particularly when the band 6 is made of metal, tends to expand the metal of the band, thereby to some extent increasing its length. The marginal portions of the band being free from the heated material would not be subjected to the same high temperature as the liquid covered portion of the band and hence would not be expanded to the same extent. In this way the band would be caused to expand unequally in its central and marginal side portions. Again the heat of the oven similarly effects the band, the liquid covered portions of the band being affected differently than the uncovered marginal portions. These forces together with others which may or may not be wholly understood have the effect as a practical matter of producing changes in the length of the belt in various longitudinal sections thereof.

When a band such as above referred to is employed for the production of sheet material from a fluid base, it is highly desirable, if not necessary, that the band be maintained level in order that there be no tendency for the fluid material to flow to one side or the other which would result in a sheet of uneven thickness. It has been found that where a stainless steel band such as above mentioned has been employed for the production of sheeting for a considerable length of time, it becomes stretched in certain localities more than in others with the result that one side edge may be longer than the other side edge, thereby permitting the belt to assume a transversely canted position. It is also possible that in some instances the central portion of the belt may become stretched to a greater extent than either edge with a resulting objectionable buckling. To a certain extent the canting of buckling of the belt may be counteracted by the provision of suitable supports for the belt but it is desirable that the belt be occasionally restored to proper leveled condition.

For the purpose of restoring the belt to uniform length throughout its width so that it will naturally assume the desired transversely level position, there is provided apparatus through which the band passes and which operates to stretch any excessively shortened portion of the belt to equalize its length with that of other portions of the belt. The stretching apparatus herein disclosed comprises a pair of rolls 12 and 13 which extend transversely of the belt and are spaced longitudinally thereof and a roll 14 which extends transversely of the belt and is so related to the rolls 12 and 13 as to be adapted to engage the belt intermediate the zones of engagement of the belt with the rolls 12 and 13.

The rolls 12 and 13 are journaled at each end in suitable bearing brackets 15 and 16 and said bearing brackets are rigidly mounted on a channel iron member 17. The channel iron members 17 under the bearing brackets at the opposite ends of the rolls are interconnected by a longitudinally extending member 18 which may also be of channel iron form, if desired.

The upper roll 14 is journaled in suitable arms or legs 19 which depend from a longitudinally extending tie member 20. The legs 19 are vertically, slidably mounted in suitable ways indicated at 21 which are provided in bracket members 22 which are in turn rigidly secured adjacent their lower ends to the channel iron end members 17. The brackets 22 may be welded, riveted or otherwise secured to the members 17. Bolts such as indicated at 23 are anchored in the bracket members 22 and extend upwardly therefrom and through suitable openings indicated at 24 in end extensions 25 of the member 20. Nuts such as indicated at 26 on the threaded upper ends of the bolts are provided for forcing the upper roll carrying structure downwardly. Suitable coil springs 27 serve normally to lift the upper roll 14 when permitted to do so by unscrewing of the nuts 26.

The rolls structure as above described is supported in any suitable manner, for example, by means of a shelf like structure, here illustrated as embodying an angle iron framework including front and rear members 28 and 29 and end members 30 and 31. Said shelf like structure is supported in fixed position by being bolted or otherwise secured as indicated at 32 to the supporting frame 33 for the front roll 7 or to other suitable supporting structure. Braces such as indicated at 34 may also be employed to hold the shelf structure rigidly in position. It is desirable that under normal conditions the roll structure be permitted to shift endwise so as to be capable of following any weaving or sidewise creeping tendency of the belt 6 and such movement is permitted by supporting the roll structure on the shelf structure through the agency of a pair of round iron rods or rolls such as indicated at 35, said rods or rolls being interposed between the front and back shelf members 28 and 29 and the longitudinal member 18 of the roll supporting framework.

As herein shown, the leveling apparatus is positioned to operate on the lower reach of the conveyor band 6 adjacent the roll 7. To prevent the leveling apparatus from travelling with the band, and for holding the leveling apparatus in the desired position of parallelism with the roll 7, there are provided a pair of set screws such as indicated at 36 rotatably supported in suitably apertured bosses 37 and threadedly engaging suitably tapped openings in bosses 38. Said bosses 38 are carried by the end members 17 and it will be seen by examination of Figs. 2, 3 and 5 that by adjusting the screws 36, the angular relationship of the leveling roll structure to the supporting roll 7 may be adjusted as desired. In other words, the adjusting screws 36 permit the rolls 12, 13 and 14 to be adjusted to any desired angular transverse relation to the belt 6.

When the band leveling roll structure is not to be operated, the rolls 12 and 13 are lowered by removing the rods 35 so as to permit the frame structure 17 to rest directly on the supporting shelf structure and the roll 14 is adjusted to an elevated position by unscrewing the nuts 26. Sufficient adjustment is provided in this manner to space the roll 14 upwardly from the rolls 12 and 13 to permit the band 6 to pass between the upper and lower rolls without engaging them.

When the rolls are in operative condition as illustrated in the drawings the band is caused to travel through offsets between its zones of engagement with the rolls 12, 13 and 14. In each bending of the band around one of the rolls, the metal of the band, particularly adjacent the face of the band which is away from the engaged roll, is subjected to stretching beyond the normal elastic limit of the metal of the band with the result that permanent elongation of the stretched band portion results. The extent to which the band is stretched may be controlled by adjustment of the roll 14 toward and from the roll pair 12 and 13. Because of the constantly high tensioned condition of the belt between its supporting rolls 7 and 8, the roll structure 12, 13 and 14 is enabled to effect stretching of the band without excessively and objectionably bending the same.

It will be observed that the higher the tension under which the band is supported between its rolls 7 and 8, the less will be the bending required for effecting stretching thereof. In a band in which one marginal side portion, for example, is of less length than the balance of the band, such marginal side portion will be under somewhat greater tension than the remainder of the band and hence, if bent to the same extent as other, less tensioned portions, will nevertheless be stretched to a point more nearly approaching its elastic limit. The rolls 12, 13 and 14 may be so adjusted that they will effect stretching of only the shortened marginal portion without producing any stretching effect in the balance of the band. By suitably adjusting the relationship of the roll 14 to the rolls 12 and 13, sufficient stretching of the band may be effected to equalize all inequalities which may have developed in the practical, normal use of the band. As a practical matter, it is usual that one edge portion of the band is shortened to a greater extent than the other edge portion. In effecting straightening or leveling of the band, it is advantageous to operate on one edge portion first and then the other edge portion so that ordinarily and during most of the time that the band leveling operation is effected, the upper roll 14 is adjusted into closer relationship to the lower rolls at one end than at the other end.

The described leveling apparatus is advantageous not only for restoring a band to level condition or to uniform length condition but also for initially levelling the same. Bands of the type illustrated are of course made from a long web of the required sheet metal, the ends of which web are usually welded together. In the joining of the ends of the web to form the band, it appears to be almost impossible to obtain such accuracy that one side of the band will not be longer than the other.

When a new band is installed in the sheetmaking apparatus, it may be inaccurate to such an extent that the band will have a distinct tendency to weave from side to side or to travel to one side to such an extent that if not adequately controlled it would run off the supporting rolls 7 and 8. Apparatus employing bands such as described, are usually equipped with suitable means for guiding or confining the band to a predetermined path of travel, but such confining means are not always sufficiently effective in the case of a very inaccurate band.

To facilitate employment of the band leveling roll structure with new bands, there are provided a pair of diverging links indicated at 39 and 40. Said links 39 and 40 have their outer ends pivoted as indicated at 41 to the member 29 of the shelf structure and their front or inner ends pivoted as indicated at 42 to the longitudinal connecting member 18 of the roll structure. When these links are employed, the adjusting screws 36 are backed out so as to be inoperative and the links 39 and 40 permitted to control the position of the roll structure.

The above mentioned unequal distortion of the band at its opposite edges is true also in respect of a new band so that when leveling a new band the rolls are preferably adjusted into closer relationship at one end than at the other to operate on one marginal portion of the band at a time. Under such circumstances, the band has a strong tendency to rock the rolls 12, 13 and 14 forwardly at the side which is being worked on, due to the resistance of the band to movement between the operating end portions of the rolls.

If, for example, the right hand edge of the band in Figure 4 was being operated on, the band would have a normal tendency to migrate to the right. This tendency appears to be due to the relatively tight fit of the band on its supporting rolls 7 and 8 at the right hand side. Whether or not that is true explanation of such tendency of the band, it has been observed that such tendency does exist. Under such circumstances the band would also have a tendency to carry forwardly with it, the right hand end of the roll apparatus with the result that the roll structure would be rocked on the supporting links 39 and 40 so as to cause the links 39 and 40 to rotate in a counter-clockwise direction about their pivots 41 as viewed in Figure 5. Because of the diverging relationship of the links, it will be apparent that such rocking thereof would effect cocking or angling of the rolls so as to cause them to have a tendency to feed the belt to the left, it being understood that the rolls tend to feed the belt forwardly at right angles to their axes. Thus it will be seen that the roll structure, when controlled by the links 39 and 40, will operate to counteract and correct any tendency for the belt to migrate to one side.

It will further be apparent that the band leveling rolls and their diverging guide links may be employed for band steering purposes even under normal operating conditions without necessarily adjusting the rolls to effect any band leveling operation. For that purpose, the rolls may be adjusted into accurate axial parallelism so that a perfectly level band would resist movement between the rolls to the same extent at all points in the width of the band. In that case there would normally be no requirement for shifting the band to one side or the other since a perfectly level band would not normally have any pronounced tendency to migrate to either side. However, as a practical matter, it is seldom, if ever, that a metal band of the character herein contemplated is perfectly level so that there is normally some differential in the resistance to travel of the band between the rolls at its opposite sides. Such differential is sufficient to effect cocking or angling of the rolls in the manner above explained to steer the band in the direction opposite to that which its "tightest side" tends to cause it to migrate.

When a belt has once been worked into proper operative relationship to its supporting pulleys, it has been found unnecessary to again employ the links 39 and 40 for controlling the roll structure. Hence, after the initial working in of a belt, the said links may be disengaged from the roll structure and swung to an inoperative position and the said screws 36 employed for controlling the position of the roll structure as already explained.

Changes in the described arrangement may be made without departing from the spirit of the invention, the scope of which should be determined by reference to the following claims, the same being construed as broadly as possible consistent with the state of the art.

I claim:

1. In sheet forming apparatus embodying a driven, elongated, endless, metal conveyor band having a substantial portion of its length suspended, the length of the band being such that said suspended portion is under substantial tension as an incident to the weight of the band, said band being employed to carry a coating of liquid applied to the longitudinally extending central area but not to the marginal side areas of the band, through an oven for converting the coating into a sheet, said band being thereby unequally effected in said central and marginal areas by the oven temperature whereby expansion or contraction of the band occurs in different degrees in said central and marginal areas of the band, and whereby the band, in time, becomes permanently distorted with a transverse curl sufficient to severely impair the utility of the band for said purpose, means for leveling the band comprising band-flexing roll means disposed so as to act on said suspended portion of the band when driven to effect stretching of any portion thereof which is under higher tension than another portion, thereby to equalize the length of such portions, and means for supporting said roll means for movement in an axial direction, whereby said roll means is capable of following sidewise shifting of the belt.

2. In sheet forming apparatus embodying a driven, elongated, endless, metal conveyor band having a substantial portion of its length suspended, the length of the band being such that said suspended portion is under substantial tension as an incident to the weight of the band, said band being employed to carry a coating of liquid applied to the longitudinally extending central area but not to the marginal side areas of the band, through an oven for converting the coating into a sheet, said band being thereby unequally effected in said central and marginal areas by the oven temperature whereby expansion or contraction of the band occurs in different degrees in said central and marginal areas of the band, and whereby the band, in time, becomes permanently distorted with a transverse curl sufficient to severely impair the utility of the band for said purpose, means for leveling the band comprising band-flexing roll means disposed so as to act on said suspended portion of the band when driven to effect stretching of any portion thereof which is under higher tension than another portion, thereby to equalize the length of such portions, and adjustable means for setting said roll means in selected position of transverse angularity relative to the length of the belt so as to counteract any tendencies of the belt to shift in a sidewise direction as an incident to its normal movement.

3. In sheet forming apparatus embodying a driven, elongated, endless, metal conveyor band having a substantial portion of its length suspended, the length of the band being such that said suspended portion is under substantial tension as an incident to the weight of the band, said band being employed to carry a coating of liquid applied to the longitudinally extending central area but not to the marginal side areas of the band, through an oven for converting the coating into a sheet, said band being thereby unequally effected in said central and marginal areas by the oven temperature whereby expansion or contraction of the band occurs in different degrees in said central and marginal areas of the band, and whereby the band, in time, becomes permanently distorted with a transverse curl sufficient to severely impair the utility of the band for said purpose, means for leveling the band comprising band-flexing roll means disposed so as to act on said suspended portion of the band when driven to effect stretching of any portion thereof which is under higher tension than another portion, thereby to equalize the length of such portions, and a pair of relatively diverging links, each pivotally connected at one end to said roll means and at its other end to relatively fixed supporting means for anchoring said roll means against traveling with the belt while permitting controlled axial movement of said roll means.

4. In an apparatus embodying a driven, thin, flexible metal conveyor band which has a substantial portion of its length suspended and under substantial tension between supporting rolls, means for equalizing the lengths of all longitudinal portions of the band so as to effect leveling thereof, comprising a pair of rolls adapted to engage one face of the suspended and tensioned portion of said band, a roll adapted to engage the other face of the band intermediate the zones of engagement between said band and said pair of rolls, and means for holding said roll in selected position relative to said pair of rolls so as to cause said rolls to effect bending of said band in opposite directions incident to its travel between said rolls, said bending being effected to such an extent that any longitudinally extending portion of the band under higher tension than another portion thereof will be stretched so as to lengthen the portion under higher tension, and means for supporting said rolls for movement in an axial direction, whereby said rolls are capable of following sidewise shifting of the belt.

5. In an apparatus embodying a driven, thin, flexible metal conveyor band which has a substantial portion of its length suspended and under substantial tension between supporting rolls, means for equalizing the length of all longitudinal portions of the band so as to effect leveling thereof, comprising a frame, a pair of rolls rotatably mounted in said frame and adapted to engage one face of the suspended and tensioned portion of said band, a third roll mounted in said frame and adapted to engage the other face of the band intermediate the zones of engagement between said band and said pair of rolls, and means for holding said third roll in selected position relative to said pair of rolls so as to cause said rolls to effect bending of said band in opposite directions incident to its travel between said rolls, said bending being effected to such an extent that any longitudinally extending portion of the band under higher tension than another portion thereof will be stretched so as to lengthen the portion under higher tension, and a pair of relatively diverging links, each pivotally connected at one end to said frame and at its other end to relatively fixed supporting means for anchoring said rolls against traveling with the belt while permitting controlled axial movement of said rolls.

EDOUARD M. KRATZ.